Patented Sept. 23, 1952

2,611,776

UNITED STATES PATENT OFFICE 2,611,776

BIS-PHENYLOL SILANES

John L. Speier, Jr., Pittsburgh, Pa., assignor to Dow Corning Corporation, Midland, Mich., a corporation of Michigan No Drawing. Application September 18, 1950, Serial No. 185,513. In Great Britain November 29, 1949

6 Claims. (Cl. 260—448.2)

The present invention relates to the production of dimethylbis(phenylol) silanes.

Phenoxysilanes such as tetraphenylsilicate have been described in the literature. The compounds produced in accordance with the method of the present invention are distinguished from the phenoxysilanes in that the hydroxyl substituent on the benzene ring is not bonded to the silicon. Both the hydroxyl and the silicon substituents are on the ring.

In accordance with the method of the present invention, a dimethylbis-halophenoxysilane is reacted by contacting it with molten alkali metal in the presence of trimethylchlorosilane. The reaction product is then hydrolyzed, whereby there is obtained a dimethylbis(phenylol) silane.

The dimethylbis-halophenoxysilane may be substituted with a methyl radical in the ring if desired. This raw material may be prepared by adding two equivalents of chlorophenol or chlorocresol to one equivalent of dimethyldichlorosilane. Upon heating, hydrogen chloride is expelled, with the formation of the desired product. Alternatively, dimethyldiethoxysilane may be employed instead of the dimethyldichlorosilane. In this case ethyl alcohol is expelled upon heating. If desired, the product may be purified by distillation, though this is unnecessary for the present process. Thus, these materials are of the following general formula:

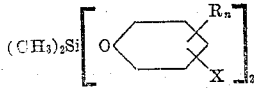

where R represents alkyl, n has a whole value from 0 to 1, and X represents halogen.

Trimethylchlorosilane is well known and has been described in the literature.

When the dimethylbis-halophenoxysilane or dimethylbis(halocresoxy)silane is contacted with the molten alkali metal in the presence of trimethylchlorosilane, reaction occurs with the production of a product, which upon hydrolysis yields dimethylbis(phenylol) silane or dimethylbis(cresylol) silane. The product which one would expect to obtain from the alkali metal reaction would be as follows:

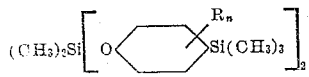

The product actually obtained is probably as follows:

In order to contact the halophenoxysilane with the molten alkali metal in the presence of trimethylchlorosilane, various operative procedures may be followed. Thus, the molten alkali metal may be in suspension in the trimethylchlorosilane and the halophenoxysilane added to the suspension. Alternatively, the trimethylchlorosilane and the halophenoxysilane may be mixed and the mixture added to the molten alkali metal, either alone or in suspension in an inert hydrocarbon solvent such as octane or toluene.

Molten sodium and potassium or alloys thereof are preferred in accordance herewith, due to the low melting points thereof. Lithium is not a preferred species, since its melting point is substantially higher.

The resulting dimethylbis-phenylolsilane so obtained is insoluble in cold water, soluble in cold alcohol, and soluble in boiling water. When the bis-phenols are reacted with aqueous formaldehyde, cleavage of the phenolic group from the silicon occurs. However, the products do react with hexamethylenetetramine to form the expected phenolformaldehyde condensation resins containing silicon. Resins so prepared are thermosetting in character and after filling with a suitable filler, such as asbestos, may be molded under heat and pressure in accordance with conventional methods employed for the molding of phenol-formaldehyde resins.

The compounds hereof, furthermore, are active bactericides. Thus, the compounds hereof, in a concentration of 0.025 per cent by weight, are more effective in controlling the growth of *Staphylococcus aureus* than phenol at a concentration of 0.125 per cent.

Example 1

A mixture was prepared of one molecular equivalent of parabromophenol and one equivalent of diethoxydimethylsilane. The mixture was heated to distill the ethanol produced and the excess diethoxydimethylsilane. There was thereby obtained dimethylbis-parabromophenoxysilane which had a boiling point of 219° C. at 1 mm. A mixture was prepared of 122 grams of this compound and 65 grams of chlorotrimethylsilane. The mixture was added to 30 grams of molten sodium suspended in 200 cc. of boiling toluene containing 10 grams of chlorotrimethylsilane. The mixture was refluxed for one-half hour, following which it was cooled and filtered. The toluene was removed by distillation. 110 grams of a viscous material was obtained (theory equal 117 grams). This product was then distilled to 300° C. at 20 mm. to remove low boiling product. The residue was hydrolyzed by dissolving it in alcohol and adding one drop of one normal HCl, following which water was gradually added until the mixture no longer remained clear but retained its turbidity. Further water was added to precipitate the product. The hydrolyzate so obtained was crystalline and was recrystallized from aqueous methanol. The product, dimethyl-bis(p-phenylol)silane, had a melting point of 173° to 174° C.

*Example 2*

The procedure of Example 1 was repeated with the substitution of p-chlorophenol for the p-bromophenol of Example 1. The same product was obtained.

*Example 3*

The procedure of Example 1 was repeated, employing 3-methyl-4-chlorophenol in place of the p-bromophenol. The following product was obtained:

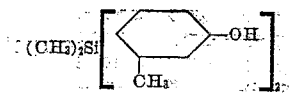

This compound has a melting point of 208° to 210° C.

That which is claimed is:

1. The method of producing dimethylbis(phenylol)silanes which comprises reacting a dimethylbis-halophenoxysilane of the formula

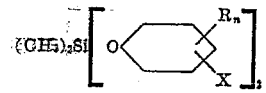

in which R represents an alkyl radical, X represents a halogen atom, and n is an integer from 0 to 1 inclusive, with trimethylchlorosilane by contacting the two with an alkali metal, and hydrolyzing the reaction product.

2. The method in accord with claim 1 wherein R represents a methyl radical.

3. The method in accord with claim 1 wherein X is selected from the group consisting of chlorine and bromine atoms.

4. The method of producing dimethylbis(phenylol)silanes which comprises reacting a dimethylbis-halophenoxysilane of the formula in which R represents an alkyl radical, X represents a halogen atom, and n is an integer from 0 to 1 inclusive, with trimethylchlorosilane by contacting the two in liquid phase with a molten alkali metal, and hydrolyzing the reaction product.

5. The method in accordance with claim 4 wherein R represents a methyl radical.

6. The method in accordance with claim 4 wherein X is selected from the group consisting of chlorine and bromine atoms.

JOHN L. SPEIER, Jr.

No references cited.